United States Patent

[11] 3,582,902

[72] Inventors Allen C. Hirtle
Needham;
Thomas O. Holtey, Newton Lower Falls;
Christopher Plumley, Wayland, all of Mass.

[21] Appl. No. 787,874
[22] Filed Dec. 30, 1968
[45] Patented June 1, 1971
[73] Assignee Honeywell Inc.
Minneapolis, Minn.

[54] DATA PROCESSING SYSTEM HAVING AUXILIARY REGISTER STORAGE
28 Claims, 7 Drawing Figs.

[52] U.S. Cl. .......... 340/172.5, 307/221, 235/157
[51] Int. Cl. .......... G11c 19/00
[50] Field of Search .......... 340/172.5; 235/157; 307/221

[56] References Cited
UNITED STATES PATENTS
3,051,929 8/1962 Smith .......... 340/172.5
3,371,320 2/1968 Lachenmayer .......... 340/172.5
OTHER REFERENCES
IMB Technical Disclosure Bulletin, I Vol. 9, No. 11, April 1967, " Shift Register" by P. N. Anderson

*Primary Examiner*—Gareth D. Shaw
*Attorneys*—Fred Jacob and Leo Stanger

ABSTRACT: In electronic data processing apparatus wherein each basic storage element comprising the conventional working registers of the data processing apparatus is supplemented by an auxiliary storage element of similar construction; the auxiliary storage element being capable of loading, or being selectively loaded with information in its associated basic storage element. Also provided are means for logically interconnecting the auxiliary storage elements to form a single shift register; the last named means including means for periodically shifting the contents of the extended shift register to other portions of the data processing apparatus for storage and/or analysis.

INVENTORS

ALLEN C. HIRTLE

THOMAS O. HOLTEY

CHRISTOPHER PLUMLEY

BY FAITH F. DRISCOLL

AGENT

INVENTORS
ALLEN C. HIRTLE
THOMAS O. HOLTEY
CHRISTOPHER PLUMLEY

BY FAITH F. DRISCOLL
AGENT

INVENTORS
ALLEN C. HIRTLE
THOMAS O. HOLTEY
CHRISTOPHER PLUMLEY

BY FAITH F. DRISCOLL

AGENT

INVENTORS
ALLEN C. HIRTLE
THOMAS O. HOLTEY
CHRISTOPHER PLUMLEY

BY FAITH F. DRISCOLL
AGENT

DATA PROCESSING SYSTEM HAVING AUXILIARY REGISTER STORAGE

BACKGROUND OF THE INVENTION

The present invention concerns an electronic data processing apparatus; and more specifically, it provides means for conveniently loading and unloading the informational content of the various control and storage registers thereof.

The introduction of integrated circuits and particularly large scale integration has prompted a reexamination of basic values concerned with the design of circuits utilized in data processing apparatus. Heretofore, such circuits have been designed with major consideration given to conserve the number of active and passive circuit components, and only minor consideration has been given to the manner and means of interconnecting these components.

However, with integrated circuits, the ratio between the cost per circuit and the cost per wire has changed appreciably relative to the cost of previous fabricating techniques. Accordingly, the physical amount of wire required to interconnect the various integrated circuits becomes of increased importance.

In accordance with conventional implementation techniques, connections are made to various points on integrated circuit (IC) chips mounted on a circuit board from connector pins associated with a backboard connector. Physical wires are attached to these pins for interconnecting the integrated circuits of different boards. This has been accomplished by any one of a number of techniques including the use of Gardner-Denver wire wrap machines.

To increase the ratio of output pins per IC chip, it has heretofore been proposed either to provide narrower spacing between connector pins or reduce the size of etched wires on the chip by deeper etch techniques.

A slightly different approach has been taken in interconnecting the major components of the system. Some have reduced the complexity or congestion in making interconnections, which reduces the number of wires between components of the system. One such technique involves organizing the major data paths interconnecting the registers of the central processor and arithmetic unit into a bus-type system which communicates with a number of peripheral devices serially connected to the bus. An example of this arrangement is disclosed in U.S. Pat. No. 3,323,110, which issued May 30, 1967 to Oliari and Fischer.

Although this technique reduces congestion in the cabling system, the total number of pins on the circuit boards essentially remains the same, as each interconnection still requires pins. Additionally, because of time constraints on the system, it is not possible or practical to interconnect certain system components in the above-indicated manner.

SUMMARY OF THE INVENTION

Accordingly, an object of the present invention is to further reduce the number of backboard interconnections while at the same time enhance the operational characteristics of the associated data processing system.

The foregoing object is achieved in a preferred embodiment of the present invention by associating an auxiliary storage device with each basic bistable storage device constituting the conventional registers of the data processing system. Each auxiliary storage device logically connects to the associated basic bistable storage device by way of means for either selectively loading or unloading the informational contents of the latter respectively from or into the former. Further, the auxiliary storage devices interconnect in a serial fashion to form an extended shift register, enabling information stored off from the basic storage devices to be conveniently analyzed. To this end, means are provided to serially shift the information in the extended shift register either into reserve memory locations for analysis by program or into a bank of light-operating storage devices mounted on an associated maintenance panel for visual analysis by an operator.

It is therefore another more specific object of the present invention to provide diagnostic means in association with a data processing system for conveniently sampling and storing of information currently contained in the working registers of the associated data processing system in other portions of the data processing system for subsequent analysis or use.

In addition to assisting a diagnostician in localizing faulty system components on the basis of either intermittent or recurrent error conditions, the ability of the present system to selectively load and unload the contents of the working registers has additional application in handling interrupt operations. Normally, when a data processing system capable of processing interrupts receives an interrupt request, it stores the information currently being processed in its memory i.e. the status of the interrupted program. Considerable time is expended in executing the routines for this accessing of the memory to store the status of the interrupted program, and again to restore this information in the processing section when the interrupt has been processed. This time expenditure is particularly costly where, for example, one program is repeatedly interrupting a second program for brief intervals.

With this in mind, it is a further object of the invention to provide means in a data processing system for temporarily storing the status of an interrupted program with relatively simple logic and hence in a short time. Further, it is an object to provide a data processing system in which an interrupting routine can be loaded into the working registers of the system concurrent with the storage of the status of the interrupted routine, i.e. of the current contents of the same registers.

A still further object of the present invention is to provide means in association with a data processing system to facilitate the introduction of information regarding an interrupt routine upon the occurrence of an interrupt signal.

The foregoing objects and features of novelty which characterize the present invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

DESCRIPTION OF THE PREFERRED EMBODIMENT

Figure 1:
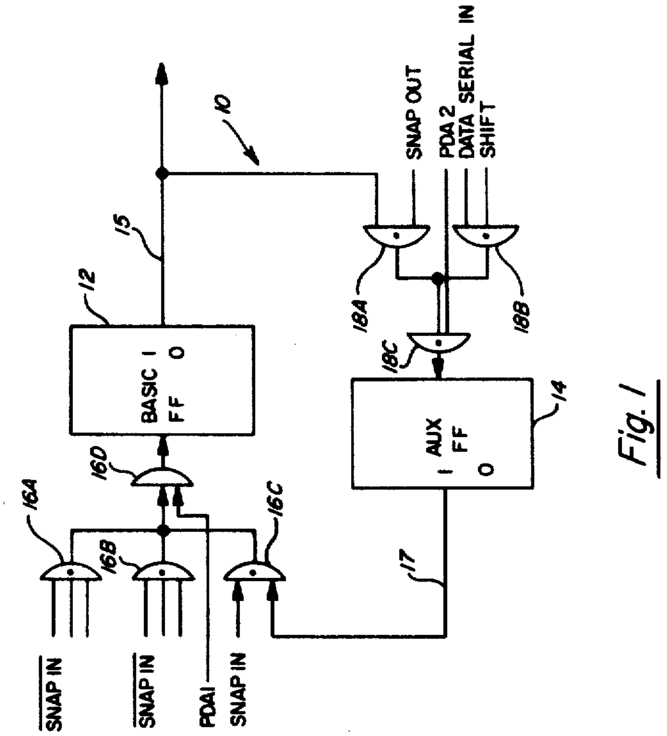
FIG. 1 is a detailed representation of a basic multi flip-flop element embodying features of the present invention.

FIG. 1 shows a multiple flip-flop storage unit 10 for use in the practice of the present invention. As indicated above, each storage unit 10 has a basic flip-flop 12 and an auxiliary flip-flop 14. Both the flip-flops 12 and 14 conventionally have the operational characteristics of being clocked and raceless. Specifically, each flip-flop switches to the state of the input signals applied thereto upon the application of a timing pulse.

Each flip-flop 12 and 14 in the illustrated embodiment is of integrated circuit (IC) construction formed from a single "chip." An example of one such flip-flop is disclosed in the article titled "High Level Transistor Transistor Logic Flip-Flop" by R. Ligten, K. Taft and T. Longo appearing in the Nerem Record, Nov. 1965, Volume 7 at page 177.

The gating circuitry associated with the input of the basic flip-flop 12 includes AND gates 16*a*, 16*b* and 16*c* buffered through a timing AND gate 16*d* into the flip-flop 12 in a conventional manner. The conditioning signals applied to AND gates 16*a* and 16*b* are received from the same control components normally connected to the storage flip-flop of a register, accumulator, or like flip-flop assemblage. A further conditioning signal on a line $\overline{\text{SNAP-IN}}$ also is connected as an input to these gates. The conditioning signals to AND gate 16*c* include a signal, on line 17, indicative of the current status of the auxiliary flip-flop 14. Also, gate 16*c* receives a selectively generated control signal on a line SNAP-IN indicating that the contents of the auxiliary flip-flop 14 are being "snapped in" or duplicated in the basic flip-flop 12. An absence of the signal on the line $\overline{\text{SNAP-IN}}$ to gates 16*a* and 16*b* at this time inhibits the interconnecting gating signals applied from a previous stage, having a storage unit 10 or conventional construction, from affecting the status of the basic flip-flop 12 when the contents of the auxiliary flip-flop 14 are being "snapped in." (FIG. 3, discussed hereinbelow, presents an example of the operation of the gating circuitry for the flip-flop 12.)

In somewhat similar manner, gating structure to the input of the auxiliary flip-flop 14 includes AND gates 18*a*, 18*b* and 18*c*. AND gate 18*a* is conditioned by an output on line 15 from the flip-flop 12, as well as by a selectively generated signal on a line SNAPOUT indicating that the contents of the basic flip-flop 12 have been "snapped out" for storage in the auxiliary flip-flop 14. A signal on a SHIFT signal line and a signal on the line DATA SERIAL IN, representative of data to be shifted, are applied to condition the AND gate 18*b*. The output lines from the AND gates 18*a* and 18*b* are fed to the timing AND gate 18*c*.

In addition to being recirculated to the associated flip-flop 12 or 14, the output signals on lines 15 and 17 also serve in a conventional capacity. Specifically, the signal on line 17 appears as an input to the next successive storage unit 10 in the extended shift register composed of auxiliary flip-flops 14. And, in the case of the basic flip-flop 12, the signal on line 15 serves in its conventional information (data) representing capacity.

Each flip-flop 14 and 12 is independently clocked in a conventional manner by timing pulses on lines PDA1 and PDA2 connected to the AND gates 16*d* and 18*c* respectively. These pulses may be derived from a single master timing source (oscillator) or from two separate timing sources whose outputs are properly phased to guarantee raceless operation. It will be appreciated that, by phasing the timing pulses applied to the lines PDA1 and PDA2 to be exactly in time coincidence, the joint application of signals to the lines SNAP-IN and SNAP OUT conditions the flip-flops 12 and 14 to exchange information simultaneously.

Figure 2:
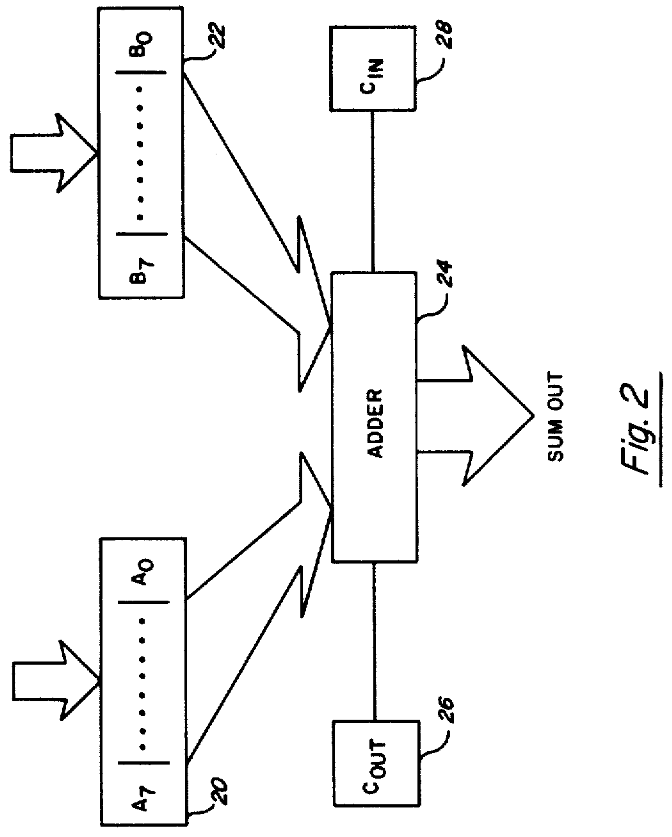
FIGS. 2 and 2A are a diagrammatic representation of a portion of a data processing apparatus implemented by way of the multi flip-flop element of FIG. 1.

In order to explain further the operation of the multi flip-flop storage unit of FIG. 1, reference is made to FIG. 2, which shows a portion of an arithmetic unit embodying features of the present invention. Included therein are 2-multibit operand registers 20 and 22 and an adder 24. For purposes of explanation, the arithmetic unit is assumed to operate on two 8-bit bytes. The two operand registers 20 and 22 may be of conventional design and hence consist of eight flip-flops each. Gating means, not shown, selectively transfer the contents of registers 20 and 22 into the 8-bit adder 24.

As the construction of the adder 24 is not pertinent to the present invention, it is sufficient to say that it includes various levels of AND and OR logic selectively interconnected to generate at its output arithmetic and logic combinations of the signals at its inputs. For details as to the implementation of an adder of this type reference may be made to U.S. Pat. No. 3,400,259 to Maczko et al. which issued on Sept. 3, 1968.

Supplementing the adder 24 in FIG. 2 are the carryout and carry-in stores 26 and 28 which may be independently implemented by using conventional flip-flops. These flip-flops receive signals from the carry chain portion of the adder 24, which for simplicity has been omitted from the drawing.

Figure 2A:
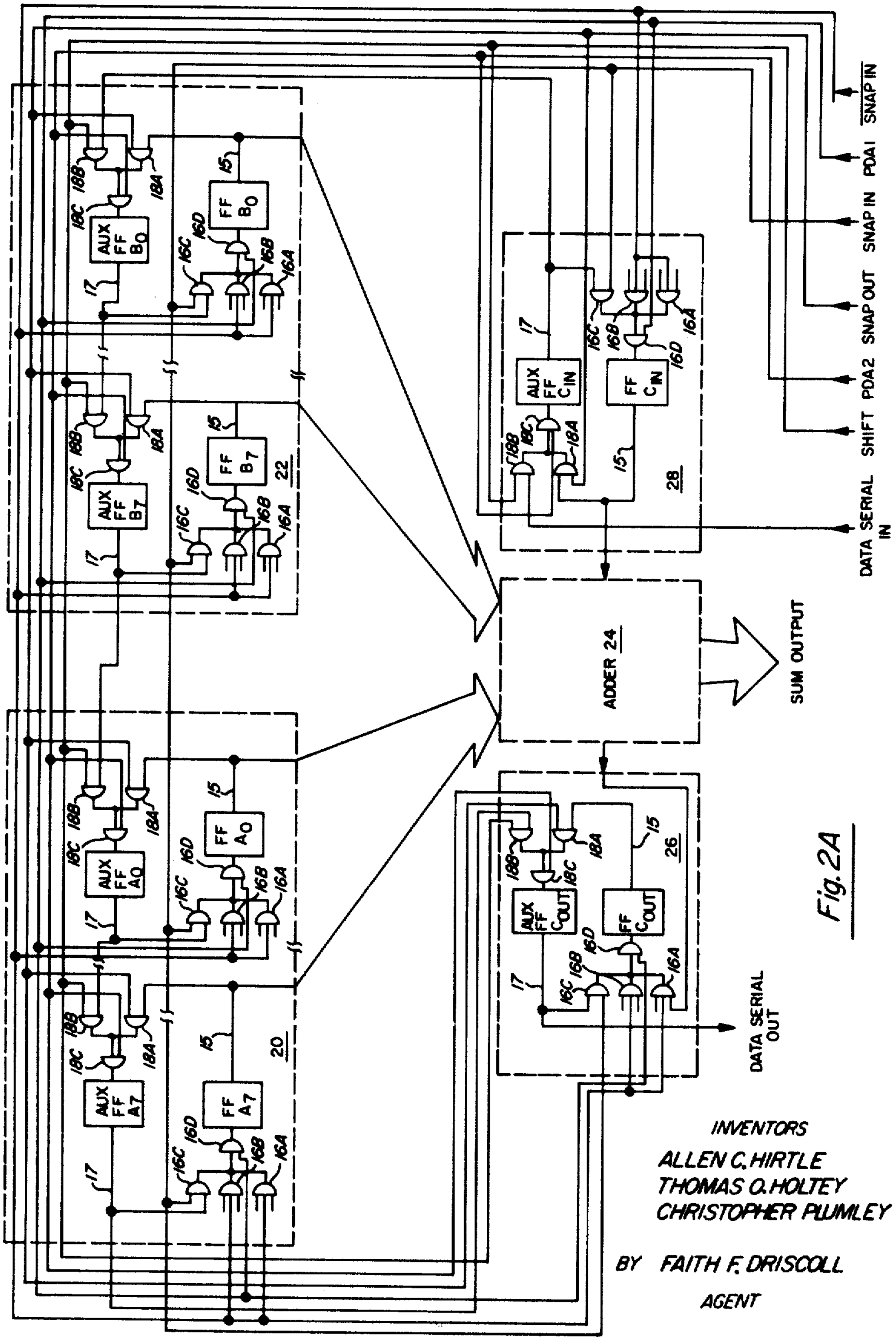

Reference is now made to FIG. 2A, which shows a more detailed representation of the apparatus of FIG. 2. Specifically, in FIG. 2A, each bistable storage element of members 20, 22, 26 and 28 is replaced by the more detailed version appearing in FIG. 1.

The arithmetic unit of FIG. 2A functions in a conventional manner and therefor will not be reviewed in detail. Briefly, referring to FIG. 2A, the two 8-bit digital representations constituting portions of two operands to be operated on are introduced into the 16 (eight per register) bistable storage elements $A_0$—$A_7$ and $B_0$—$B_7$ of the registers 20 and 22 by way of the appropriate AND gates 16*a* or 16*b*. This is done by the conditioning of appropriate ones of the AND gates 16 by portions of the operands during the presence of a signal on the $\overline{\text{SNAP-IN}}$ line, which results in the selective setting of the flip-flops $A_0$ through $A_7$ and $B_0$ through $B_7$. The outputs of these flip-flops are in turn fed into the adder 24, which logically or arithmetically combines them in the manner indicated in the aforementioned Maczko et al. patent. In addition, the carry-in flip-flop ($C_{in}$) 28 also applies a carry signal to the 8-bit adder 24. In response to these signals, the adder 24 developes a sum output signal and a carry-out signal, the latter of which partially conditions AND gate 16*a* associated with the $C_{out}$ flip-flop 26.

As mentioned above with reference to FIG. 1, each auxiliary flip-flop 14 supplements each flip-flop 12 of the members 20, 22, 26 and 28. Consequently, in addition to the normal input signal lines a $\overline{\text{SNAP-IN}}$ line feeds each AND gate 16*a* and 16*b* of each flip-flop 12 of the members 20, 22, 26 and 28. Similarly, in addition to the signal on the line SNAP-IN, the output of each auxiliary flip-flop 14 is fed back on the line 17 to AND gate 16*c* of the associated basic flip-flop 12. Also in each storage unit 10, the AND gate 16*d* receives the output of AND gates 16*a*, 16*b* and 16*c*, in addition to timing pulses on the line PDA1.

The gating structure associated with each auxiliary flip-flop 14 of members 20, 22, 26 and 28 includes the AND gates 18*a*, 18*b* and 18*c* shown in FIG. 1. In addition to a feedback signal on the line 15 representing the output of the associated flip-flop 12, the AND gates 18*a* and 18*b* in each storage unit of FIG. 2A receive a number of conditioning signals on the lines labeled "DATA SERIAL IN," "SHIFT" and, "SNAPOUT." The AND gate 18*c* receives the outputs of the AND gates 18*a* and 18*b*, in addition to timing pulses on the line PDA2.

The signal appearing on the DATA SERIAL IN line constitutes the information input signal from a preceding flip-flop to each succeeding flip-flop in the extended chain of bistable devices constituting the single shift register of the present invention. As such, the signal on the DATA SERIAL IN line to the auxiliary flip-flop $C_{in}$ (FIG. 2A, lower left) at any one instance represents the bit representation stored in the immediately preceding auxiliary flip-flop (not shown) during the preceding time pulse period. As indicated above, FIG. 2 represents only a portion of a data processing system; however, the auxiliary flip-flops 14 associated with other portions of the data processing system are also interconnected by way of the DATA SERIAL IN line.

The conditioning of the AND gate 18*b* associated with each auxiliary flip-flop in members 20, 22, 26 and 28, as well as other portions of the data processing system (not shown) is completed by the application of a signal to the SHIFT line. During the presence of the signal on the SHIFT line, each timing pulse on the line PDA2, advances the informational content of each auxiliary flip-flop 14 to the next succeeding auxiliary flip-flop 14. Thus, with continued reference to FIG. 2A, upon application of successive timing pulses PDA2, the information originally stored in the auxiliary flip-flop $C_{in}$ advances to auxiliary flip-flop $B_0$ and thence to auxiliary flip-flop $B_1$, to auxiliary flip-flop $B_2$, to auxiliary flip-flop $B_7$, to auxiliary flip-flop $A_0$, and successively on to auxiliary flip-flop $A_7$ and finally to auxiliary flip-flop $C_{out}$ (FIG. 2A, lower left). Thus, the same timing pulses shift the information stored in auxiliary flip-flop $C_{out}$ on to a DATA SERIAL OUT line. Hence, the information successively appearing at this output line is the information previously stored in the following auxiliary flip-flops: $C_{out}$, $A_7$, $A_6$, $A_5$, $A_4$, $A_3$, $A_2$, $A_1$, $A_0$, $B_7$, $B_6$, $B_5$, $B_4$, $B_3$, $B_2$, $B_1$, $B_0$, $C_{in}$.

In a similar manner, new information may be entered into the system as a series of successive signals simply by applying digits of the information to the DATA SERIAL IN line and advancing this information through successive stages of the auxiliary flip-flops of the extended shift register by the application of a corresponding number of pulses on the line PDA2 to the gates 18*c*. Means for controlling the transfer of information through the auxiliary shift register is discussed more completely below with respect to the explanation of FIG. 3.

In a manner consistent with the explanation of FIG. 1, information stored in the basic flip-flops 12 of members 20, 22, 26, and 28 is "snapped out" to the associated auxiliary flip-flops 14 upon application of gating signal to the SNAPOUT line concurrent with a timing pulse on the line PDA2. Specifically, with reference to FIG. 2A, a gating signal on the SNAPOUT line conditions one leg of the AND gate 18*a* of each auxiliary flip-flop 14 while the binary "one" or "zero" output of the associated basic flip-flop 12 applied to the line 15 conditions the other leg. And, upon the occurrence of the timing pulse on the line PDA2 to the applied timing gate 18*c* together with an output from AND gate 18*b*, the binary "one" or "zero" contents of each basic flip-flop 12 is duplicated in the associated auxiliary flip-flop 14.

In a similar manner, the contents of the auxiliary flip-flops 14 of each member 20, 22, 26 and 28 are "snapped in" to the associated basic flip-flops 12 upon receipt of the timing pulse on the line PDA1 in the presence of a signal on the line SNAP-IN. Specifically, a signal on the SNAP-IN line applies an input to the AND gate 16*c* associated with each basic flip-flop 12 of members 20, 22, 26 and 28 while binary "one" or "zero" output of the associated auxiliary flip-flops 14 applied to the lines 17 complete the conditioning of the AND gates 16*c*. The timing pulse on the line PDA1 causes the gates 16*d* to condition each basic flip-flop 12 to store information identical to that stored in the associated auxiliary flip-flop 14.

A simultaneous exchange of informational contents between the basic flip-flops 12 and associated auxiliary flip-flops 14 may be accomplished by applying signals to the lines SNAP-IN and SNAPOUT simultaneously, whereby the information exchange occurs upon the coincidence of timing pulses on the lines PDA1 and PDA2.

Although the duplication of the contents of all auxiliary flip-flops in the basic flip-flops was mentioned in relation to FIG. 2 as occurring simultaneously, it may be desirable to selectively duplicate or "snap-in" the contents of only certain auxiliary flip-flops into the associated basic flip-flops. For example, while the adder 24 is operating on or processing data, it may be only necessary in some instances (e.g. for diagnostic purposes) to alter the contents of only the B operand register 22 or a portion thereof (i.e. single stage). Accordingly, the inputs of the basic flip-flops which constitute the register 22 will be wired so that each has its AND gate 16*c* connected to the same SNAP-IN line in addition to having its AND gates 16*a* and 16*b* connected to the same $\overline{\text{SNAP-IN}}$ line. Further, the lines SNAP-IN and $\overline{\text{SNAP-IN}}$ connected to other portions of the same system also may be selectively combined in a similar fashion. For the same reasons, it may also be desirable to selectively combine (connect in common) the line SNAPOUT of certain auxiliary flip-flops of either the adder 24 of remainder of the system. The combining of selected control lines in the above manner provides a convenient way of selectively loading or unloading the informational contents of the various control and storage registers of a data processing system or portions thereof. In some instances it may be desirable to combine control lines on a partitioning by-function basis.

Figure 3A:
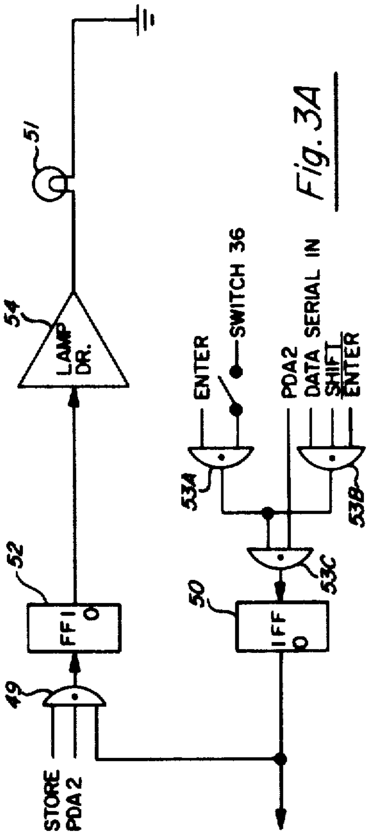
FIG. 3A is a detailed representation of the multi flip-flop element used in the implementation of portions of the data processing apparatus in FIG. 3.
Figure 3:
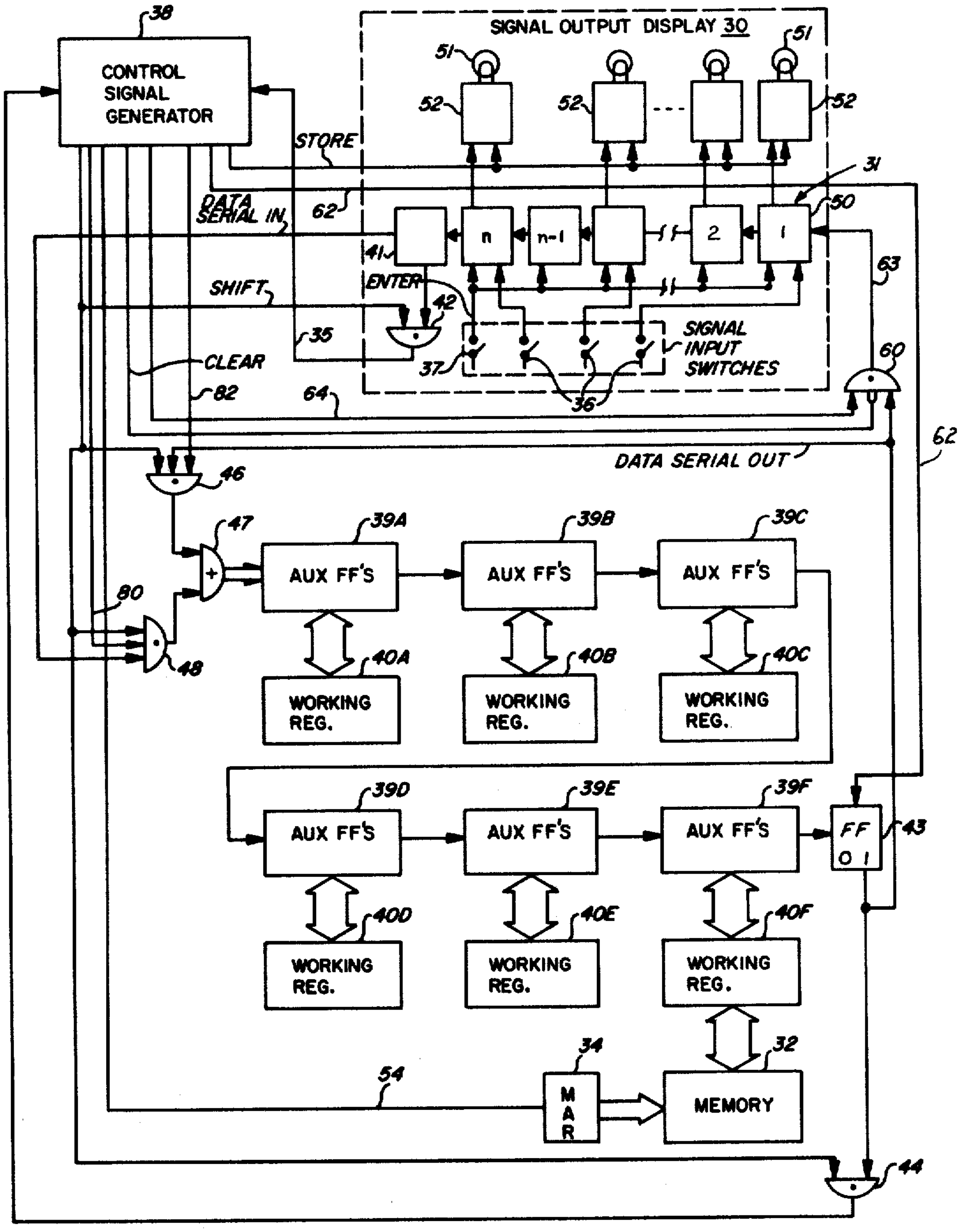
FIG. 3 is a diagrammatic representation of a data processing apparatus embodying the subject of the present invention.

Reference is now made to the FIG. 3, a diagrammatic representation of a data processing system implemented in accordance with the invention. The system has working registers 40*a* through 40*f* associated with auxiliary registers 39*a* through 39*f*. The registers 39 and 40 employ storage units 10, as shown in FIG. 1, with the basic flip-flops 12 thereof being in the working registers 40 and the auxiliary flip-flops 14 forming the registers 39. Since the functional relationship of the working registers with one another, during the normal manipulation of information within the data processing system, is of no particular significance to an understanding of the present invention, it will not described herein. However, for information relative to the interrelationship of these working registers, reference may be made to U.S. Pat. No. 3,301,762 which issued to Henry Schrimpf on Oct. 17, 1965.

The term "working register" as used herein is not limited to a register interpreted in a conventional sense and extends to any and all storage elements capable of storing information.

The foregoing definition of a working register also includes registers which serve in a control capacity. Moreover, this definition further includes devices generally capable of sensing and storing information by mechanical, electromechanical, hydraulic or similar means.

Although the illustrated embodiment of FIG. 3 associates each basic storage element with an auxiliary storage element, it may be desirable to supplement only the more significant registers with auxiliary flip-flops. Further, it may be desirable to associate only certain stages of these significant registers with auxiliary flip-flops. The type of system, the cost of circuit duplication, and the level of sophistication of diagnosing faults within a computer system, are only a few of the factors to be considered in designating the number of auxiliary flip-flops of the system.

Again, the term "auxiliary flip-flop" represents broadly a storage element consistent with the foregoing definition relative to the term "working register." It is estimated that computers of conventional design may include a thousand storage elements which in the normal practice of the present invention would be supplemented by auxiliary storage elements. However, this figure is not a limiting factor in the interpretation of the scope of the present invention.

With further reference to FIG. 3, the system has a signal output display panel unit 30 (top of drawing) for displaying the information content of the system registers. The illustrated display unit 30 has a display shift register 31 formed with flip-flops 50, and a number of separate indicator storage stages each having an indicator lamp 51 and a storage flip-flop 52 connected to one flip-flop 50 of the shift register 31. FIG. 3 also shows signal input switches 36 in the shift register 31 for additionally introducing or entering new information into the system. FIG. 3A illustrates a detailed construction of each display stage and its connection to a shift register 31 flip-flop 50 and switch 36.

The illustrated shift register 31 of FIG. 3 has the same number of flip-flop storage elements 50 as the auxiliary shift register of the present invention. This arrangement enables the display of the informational contents of all the auxiliary flip-flop stages constituting the auxiliary shift register at any given time. It will be appreciated that the number of flip-flops of the shift register 31 may be reduced appreciably, and in some instances adequate display can be provided with only a 2-flip-flop shift register. These arrangements will be discussed in relation to FIGS. 3B and 3C.

Alternative to displaying the informational contents of the various registers by the display unit 30, the informational contents of these registers may be stored for subsequent use in a memory 32. The memory 32, as shown, is addressed by a memory address register 34.

The illustrated system also has a control signal generator 38, that generates the control signals for selectively gating information into any stage or stages of the working register 40. The control signal generator 38 functions as a programmed clock, i.e. timer, by periodically emitting the requisite control signals (e.g. at intervals of 16.7 milliseconds when the generator is driven from a 60 cycle power line.) These control signals are applied to the lines mentioned in the discussion of FIGS. 1, 2, and 2A, i.e. SHIFT, SNAP-IN, $\overline{SNAP\text{-}IN}$, and SNAPOUT, as demanded by the nature of the transfer operation and the present status of the system. The control generator 38 feeds these control lines, in a manner consistent with FIG. 1, to the appropriate sets of gates of each of the auxiliary registers 39*a*—39*f* and the registers 40*a*—40*f*. Also, the lines PDA1 and PDA2 are connected to the flip-flops of FIG. 3 in the manner illustrated in FIG. 1.

The control signal generator 38 may be a conventional timer and include a counter in combination with conventional decoder logic. Alternatively, the generator 38 may be an electrically alterable read-only memory, preloaded with both data and control information, and connected to be cycled at a desired rate for generating the aforementioned control signals in the proper sequence. For an example of one type of control signal generator, reference may be made to the copending application of George Hoff and Ming Miu titled "Multiple Branching Technique" bearing Ser. No. 694,949 and assigned to the assignee hereof.

In accordance with the explanation of the present invention heretofore developed, information in the working registers 40*a*—40*f* may be displayed on the output display panel unit 30. In an illustrative operation of this type, the control signal generator 38 generates a "snapout" command that is fed to the appropriate gates of the auxiliary flip-flops 14 in the auxiliary register 39*a*—39*f*. Consistent with the explanation of FIG. 1, the contents of the flip-flops 12 of the working registers 40*a*—40*f* are "snapped out" (i.e. duplicated) into the auxiliary flip-flops 14 directly associated with the working registers flip-flops 12 upon the application of a timing pulse on the line PDA2 to the timing gates 18*c* of the flip-flops 14.

In initiating the transfer of the information stored in the auxiliary storage elements to the display unit 30, the control signal generator 38 generates a "sentry" bit which is transferred via line 62 to a storage device 43. This device 43 may be a conventional flip-flop connected to supplement the auxiliary register 39*f*; specifically, the illustrated flip-flop 43 is connected in the series chain of flip-flops in registers 39 at the end thereof and is connected via gate 60 to register 31. As discussed further hereinafter, the display unit 30 senses a binary one sentry bit as signalling the completion of the transfer of information to the unit 30. Therefore, the sentry bit must precede the information being transferred from the register 39 to the display shift register 31.

Subsequent to loading the sentry bit, the control generator 38 applies a control signal to the SHIFT line. Each timing pulse on the line PDA2, together with this SHIFT line signal, advances the information "snapped out" from the working registers through the successive stages of the auxiliary flip-flops 14 onto the DATA SERIAL OUT line and into the stages 50 of the shift register 31. The transfer through the auxiliary registers 39*a*—39*f* proceeds in the direction indicated by the arrows (i.e. from left to right in FIG. 3). This transfer to the register 31 is made possible by applying a signal, from generator 38, to line 64 to condition AND gate 60, in the presence of a $\overline{CLEAR}$ signal on the line CLEAR, to transfer the signals on the DATA SERIAL OUT line to the line 63 which connects to the input of the shift register 31.

It is assumed that shift register 31 has been previously cleared of information and therefore, prior to initiating the transfer, stores binary zeros. Clearing is necessary prior to the above-mentioned transfer in order that the system correctly senses the binary "one" sentry bit which leads the information previously "snapped out" into the auxiliary shift register of the subject invention. Accordingly, the control generator 38 clears the register 31 by applying a CLEAR signal to the line CLEAR to render the AND gate 60 inactive, thereby inhibiting the forwarding of information signals appearing on the DATA SERIAL OUT line into the first flip-flop 50 of the register 31. Under these conditions, a timing pulse on line PDA2, together with a signal on the SHIFT line, transfers a binary zero into the first of the flip-flops 50. Successive timing pulses continue the transfer of binary "zeros" digits through the flip-flops 50 of the shift register 31. After a number of successive timing pulses totaling one more than the number of flip-flops 50 (i.e. $n+1$), the shift register 31 and storage device 41 will be cleared of all information and store binary zeros. Since clocking proceeds at a rapid rate, this clearing is completed within several hundred microseconds. Alternatively, the register 31 can be cleared by connecting the CLEAR line as an input to the AND gates 46 and 48, which feeds the first stage of the auxiliary shift register of flip-flops 39. Zeros are then fed through that shift register and into the register 31′.

Continuing with the operation, a sentry detector 42 in the form of an AND gate generates an output signal, signaling the termination of the loading operation when it detects the sentry bit. Specifically, the storage device 41 generates an output signal when the binary "one" sentry bit is shifted into it. The output from the storage device 41 and the signal on the SHIFT line together condition the AND gate 42 to generate a signal on a line 35, which is sent back to the control signal generator 38. This signal indicates that the shift register 31 has been fully loaded with the information read out from the auxiliary flip-flops of the data processing system, and conditions the signal generator 38 to remove the signal on the SHIFT line.

As an alternative to the sentry bit arrangement, a counter can detect the completion of a transfer operation. Specifically, the signal generator 38 would initially reset the counter to zero, instead of generating a sentry bit. The counter, upon being conditioned by the signal on the SHIFT line generated by the generator 38, would increment in response to the timing pulses on line PDA2. When the counter had been incremented to a count of $n$ (where $n$ is the number of auxiliary flip-flops in the auxiliary shift register), decoding means connected to the output of the counter would generate a termination signal on the line 35.

With further reference to FIG. 3, after transferring information to be displayed to the register 31, the generator 38 applies a signal on the line STORE to duplicate this information in the flip-flops 52 of the display unit 30. To minimize the cost and space requirements of the display unit 30, only certain ones of the register 31 flip-flops 50 are illustrated as having a storage flip-flop 52 and indicator 51 associated with them. Consequently only the more important functions are displayed for operator viewing. However, this should not be construed as limiting; for example, during initial checkout of a data processing system, it may be advantageous to provide a complete display of the contents of all of the stages of the auxiliary register 39.

New information is introduced into the system of FIG. 3 from the signal input switches 36, which are connected to be associated with individual stages of the shift register 31. Again because of panel space restrictions and cost considerations, input switches 36 are connected to only certain flip-flops 50. Again, the switches 36 are associated with the more important functions.

An operator, by pressing an "enter" switch 37 applies a control signal, via the line ENTER, to the register 31 flip-flop 50 to transfer the data selected with switches 36 into these flip-flops. This transfer takes place at the termination of the transfer to the display panel 30 (i.e. concurrent with the termination of the signal on the line SHIFT). It is assumed that the storage device 41 has not been again cleared and hence still stores the sentry bit.

The generator 38 then applies a further signal on the SHIFT line which again conditions the auxiliary flip-flops of the auxiliary shift register 39 to respond to timing pulses on line PDA2 to transfer through successive stages thereof the information digits in the register 31 flip-flops 50. Specifically, each digit of information output from register 31 on the DATA SERIAL IN line is shifted into the first auxiliary register 39*a*, by way of AND gate 48 and the OR gate 47. The control generator 38 enables gate 48 for this operation with a control signal on line 80, and disables gate 46 at this time via line 82.

The signal on the SHIFT line in addition partially conditions a second sentry bit detector AND gate 44 during the shifting of information through the successive stages of the auxiliary shift register. The gate 44 becomes fully conditioned by an output the storage device 43 generates when the sentry bit is shifted back into it. The output of the sentry bit detector 44 is fed back to the control signal generator 38 to terminate the transfer operation. As previously discussed, a counter and decoder may alternatively be used to detect completion of the information transfer from the display unit 30 to the auxiliary shift register.

Normally, the control signal generator 38 generates a signal on the SNAP-IN line for duplicating the contents of the auxiliary register **39*a* through 39*f* in the working registers 40*a* through 40*f***.

In summary, the sequence of operations during a basic cycle of operation in accordance with the above description is as follows. The control generator 38 first generates a "snapout" signal for duplicating the states of all the flip-flops 12 of the working registers 40 in the auxiliary flip-flops 14 of the shift register 39. Then the generator 38 loads the sentry bit and, next, generates a signal on the line SHIFT allowing the information contents of the auxiliary shift register 39 to be shifted to the panel or display area (i.e. to the second shift register 31) where it is stored for display purposes (i.e. transferred to flip-flops 52 upon the generation of a signal on the line STORE) or modified by the switches 36. Subsequent to switch modification and upon the generation of a further signal on the line SHIFT, the informational contents are shifted out of the panel shift register 31 into the auxiliary flip-flops of the auxiliary shift register 39. This "return" shifting terminates when the information has been properly aligned with the flip-flops of the working registers, (as determined by detection of a sentry bit or with a shift counter). Except for the bit positions whose contents were modified by the switches 36, the auxiliary shift register now contains the same information as was originally "snapped-out" from the working registers.

The generator 38 then produces a "snap-in" signal which duplicates or "snaps in" the contents of selected auxiliary flip-flops 14 into the flip-flops 12 of the working registers. Here, the system of FIG. 3 is assumed to be wired to effect a selective "snap in" or loading of the basic flip-flops constituting the working registers and storage devices thereof. The reason for this selective operation is that only certain basic flip-flops will have their contents modified; specifically those associated with functions that are normally modified (altered) during normal system operation, (e.g. STOP, OPERATE, INTERRUPT, etc.)

As mentioned earlier, the signal generator 38 operates in a cyclic fashion to periodically generate the aforementioned control signals on the appropriate lines (i.e. SHIFT, SNAP-IN, $\overline{\text{SNAP-IN}}$, STORE, SNAPOUT) in the sequence described. When the generator 38 is driven from a 60 cycle source, the generator 38 repeats the above cycle every 16.67 milliseconds, and consequently, the contents of the working registers are transferred to the display unit 30 for operator viewing once every 16.67 milliseconds.

An alternative to entering new information into the auxiliary shift register from panel switches 36 is to load the auxiliary flip-flops from the memory 32 under the control of the signal generator 38. In this particular case, the flip-flop 43 may be eliminated from FIG. 3 and the output of auxiliary register **39*f* is directly connected to the DATA SERIAL OUT line. Further, the generator 38 generates a signal on the line 54 to set the contents of the memory address register 34 to a predetermined address. During consecutive cycles of the memory 32, the contents of successively addressed memory locations are read out into the associated working register 40*f* and selectively "snapped out" (i.e. duplicated) into the auxiliary register 39*f* in the manner previously described. During this time, the AND gate 60 is disabled by the absence of an assertion signal on the line 64 and the contents of auxiliary register 39*f* are shifted out onto the DATA SERIAL OUT line under the control of the generator 38 and recirculated by way of an AND gate 46 to the input of the auxiliary shift register. The control generator 38 applies control signals to lines 80 and 82 to disable AND gate 48 and to enable AND gate 46, respectively, during this operation. The transfer of information from the memory 32 is completed upon the read out of a punctuation character (i.e. a special character) into the register 40*f***.

Since the memory 32 facilitates the entering of new information into the auxiliary flip-flops of the extended shift register 39, the memory makes it possible to load quickly new information of an interrupt routine, as well as of a diagnostic routine, into the auxiliary shift register. The signal generator 38, in response to an interrupt signal, can then generate signals on the lines SNAP-IN, $\overline{\text{SNAP-IN}}$ and SNAPOUT, to exchange information between the working registers **40*a*—40*f* and the auxiliary registers 39*a*—39*f*. Subsequent to the exchange, the working registers store the information of the interrupt routine while the auxiliary registers store the current contents of the registers at the time of interrupt. When the system is ready to resume processing of the interrupted program, the signal generator 38** generates a signal on the line SNAP-IN which "snaps in" (i.e. restores) the contents of the auxiliary registers into the working registers in the manner previously described.

Figure 3B:
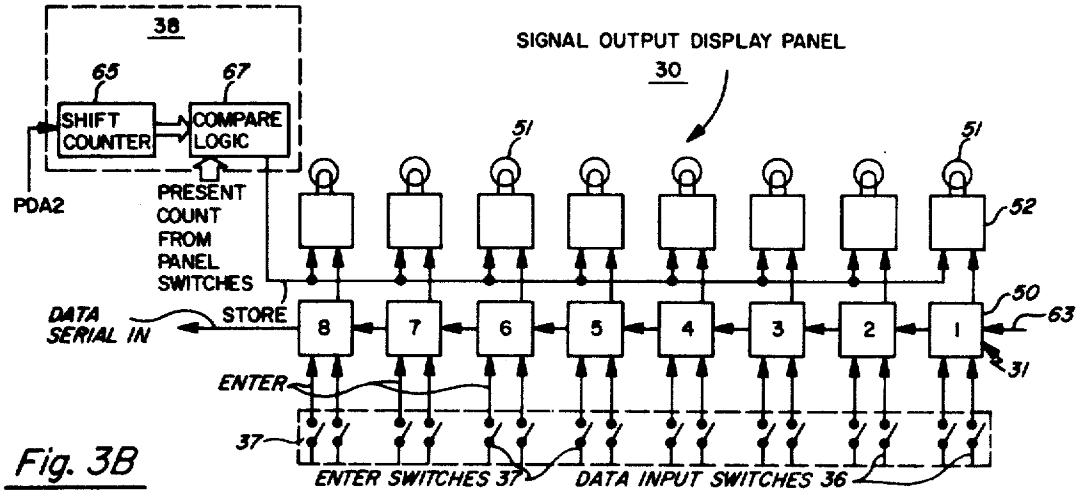
FIG. 3B is a diagrammatic representation of an alternate implementation of the display portion of FIG. 3.
Figure 3C:
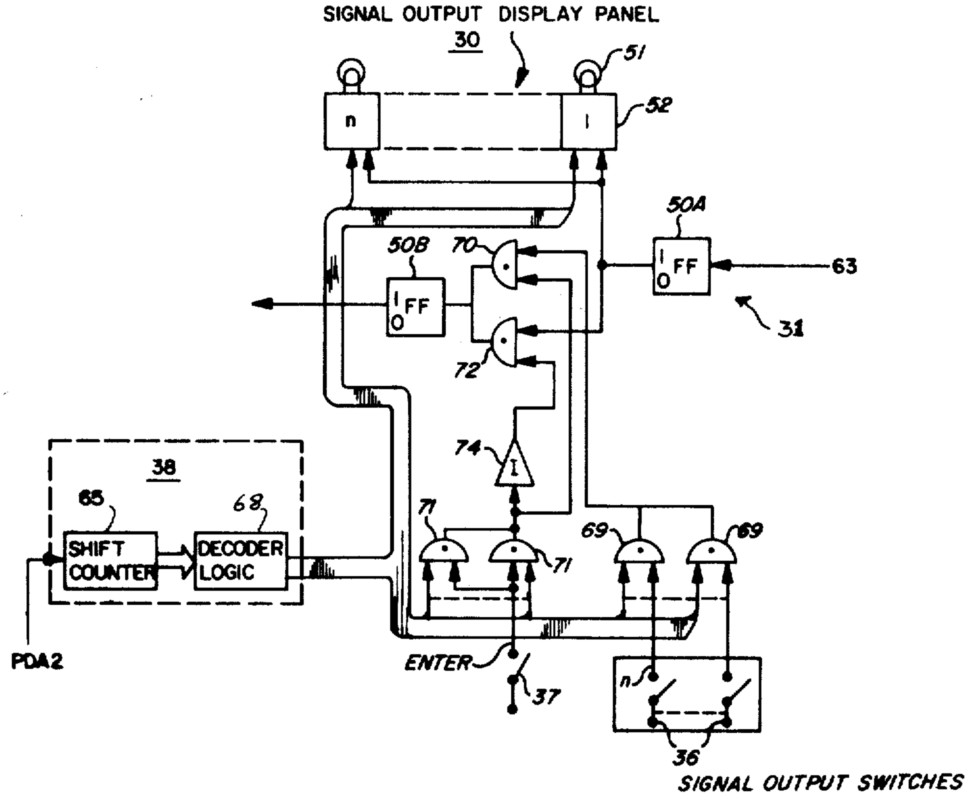
FIG. 3C is a diagrammatic representation of still another implementation of the display portion of FIG. 3.

As mentioned earlier, the number of stages of the display unit 30 may be reduced considerably and still preserve the facility of having access to any flip-flop (function) in the system of FIG. 3. In the first instance, access is preserved by displaying successive portions of the informational contents of the auxiliary shift register during the information transfer between the display unit 30 and auxiliary shift register. Also, it is possible to have the same display capability as that of FIG. 3 and still reduce the size of the shift register 31. FIGS. 3B and 3C illustrate alternate approaches for implementing the display unit 30, with corresponding reference numbers consistent with FIG. 3.

Considering FIG. 3B first, it shows an arrangement of the FIG. 3 display unit 30 which includes a storage for 8-bit portions of the auxiliary shift register 39 (FIG. 3). Specifically, the shift register 31 is illustrated in FIG. 3B as having eight flip-flops 50, each having an indicator storage flip-flop 52 and a lamp 51. The signal generator 38 includes compare logic 67 and a conventional shift counter 65 incremented by the timing pulses applied to the line PDA2. The compare logic receives the counter output and produces a control signal when the counter is advanced to whatever count the compare logic receives from panel switches (not shown).

In a manner previously described in relation to FIG. 3, the generator 38 generates a signal on the line SHIFT which sets the counter 65 to zero and conditions the counter 65 to be incremented by pulses on line PDA2. Concurrent with the incrementing of counter 65, the timing pulses shift the contents of the auxiliary register into the shift register 31, as previously described. When the compare logic 67 detects that the counter 65 has attained an 8-count preset with the panel switches, the compare logic generates a signal on line STORE which duplicates the contents of the 8-bit shift register 31 in the indicator storage stages 52 for display by the indicator lamps 51.

Therefore, when an operator wishes to examine or alter the information of a particular portion or single flip-flop of the auxiliary shift register, he sets the panel switches to a preset count corresponding to the position of the particular grouping, as may be derived from a listing or table. Automatically, upon sensing that the counter 65 has been incremented to the preset count, the compare logic 67 generates a signal on the STORE line which duplicates the contents of the shift register 31 in the display storage flip-flops 52. The desired position or grouping now is displayed for operator viewing.

At this time, the contents of the selected portion may be modified by the switches 36, with the modification being selectively introduced with enter switches 37. The modified portion is then shifted out of the shift register of FIG. 3B and returned to the flip-flops of the auxiliary shift register in the manner previously described with reference to FIG. 3. When selective entering of switch data is not desired, the switches 37 may be eliminated.

Although the above transfer operation has been described as occurring dynamically, the entire operation could alternatively be accomplished by an operator actuating switches to control the incrementing of counter 65.

Where desired, the capacity of shift register 31 may be reduced to a pair of flip-flops 50*a*, 50*b* as illustrated in FIG. 3*c*. In considering FIG. 3*c*, it is assumed that the system of FIG. 3 has a total of 256 flip-flops in the working registers 40*a*—40*f*, and that the shift counter 65 of control generator 38 has eight stages (e.g. an 8-bit counter). A decoder logic 68 replaces the FIG. 3B compare logic 67 in the generator 38. The decoder logic 68 is conventional and includes logic gates for decoding all 256 possible counts from the counter 65 and generating signals on output lines corresponding to the different counts. Each of the 256 flip-flops 52 receives, on one of its input gates, a decoding line corresponding to one of 256 decoded counts. Each of these same decoding lines are individually connected to an AND gate 71 which receives a second input from one switch 37.

During system operation, the FIG. 3C shift counter 65 is incremented by one count by each timing pulse on line PDA2 (i.e. for each shift), while the decoder 68 generates a signal on the output line associated with the particular count. This signal causes the contents of a first flip-flop 50*a* of register 31 to be loaded into the particular storage flip-flop 52 designated by the count stored in the counter 65 and to be displayed by the associated indicator 51. When the operator desires to modify the contents of one or more positions within the auxiliary shift register of the invention, he selects the appropriate switch 36 and presses the enter switches 37 which cause the data states of the switches 36 to be successively entered into a second flip-flop 50*b* of register 31 in place of the normal contents then stored in the flip-flop 50*a*. This is accomplished with a pair of AND gates 70 and 72 interconnecting the flip-flops 50*a* and 50*b* of the 2-stage shift register 31.

Specifically, actuating enter switch 37 causes an assertion signal to be applied to AND gate 70 and no assertion signal to the AND gate 72 from an inverter 74 connected in series with the switch during the particular count or counts associated with the switches 36. Each set of these signals applied to gates 70 and 72 substitutes the switch data for the data being shifted through register 31. The absence of an assertion signal at the input of AND gate 72 inhibits a transfer of the contents of flip-flop 50*a* into the flip-flop 50*b*. Concurrent with this, the signal applied to the AND gate 70 causes the data selected with switch 36 to be gated into the flip-flop 50*b*. As mentioned previously, the enter switch 37 may be eliminated where selective entering of data is not desired. With the elimination of switch 37 from FIG. 3C, and AND gate 71 will be completely conditioned by the decoder logic 68 output line connected thereto.

In addition to providing the above-described display operation, the FIG. 3 system also operates to transfer the contents of the working registers 40 into memory 32. At a later time, the same information may be restored to the working registers by way of the extended auxiliary shift register 39. In this respect, that portion of the data processing system originally identified as the working register 40*f*, is also specifically depicted in FIG. 3 as a memory local register (MLR) which serves as both an input means and an output means for information being transferred with respect to memory 32. The address register 34 receives address signals on line 54 for addressing the memory 32.

Consistent with the explanation of the operation of the FIG. 1 storage unit 10, information can be transferred into the memory 32 by the memory local register 40*f* under control of the control signal generator 38. More specifically, successive groups of digits assembled in the register 39*f* are transferred to the memory local register 40*f* in successive operations and written into the memory storage location referenced by the memory address register 34. For this operation, the information within the auxiliary storage registers 39*a* through 39*e* is circulated to register 39*f*, through a closed loop path which includes the register 39*f* and AND gate 46, with AND gate 60 being disabled by the absence of an assertion signal on the line 64 from the generator 38. When the requisite number of such transfers have taken place, the control signal generator 38 terminates the operation. The actual transfer from register 39*f* to register 40*f* takes place in response to a signal, on the SNAP-IN line, applied selectively to the register 40*f*.

Although the foregoing explanation has treated the memory local register 40*f* as being associated with a conventional memory 32, the register 40*f* can in fact provide communication of another physical unit including a peripheral unit such as magnetic and paper tape devices, drum memories, disc memories, and the like.

In further explanation of the implementation of the signal output display panel 30 including the shift register 31 and the indicator storage flip-flops 52 with associated indicators 51 and including signal input switches 36 and enter switches 37, reference is now made to FIG. 3A, which shows a typical display stage. This display stage has a flip-flop 52 receiving input signals from AND gate 49 and also has a flip-flop 50 that receives input signals from AND gates 53*a* and 53*b* via gate 53*c*. Also shown is a single input switch 36 and a single output display indicator 51, the latter being supplemented by a lamp driver 54 of conventional design.

Operationally, the circuit of FIG. 3A is in some respects similar to that disclosed in FIG. 1 with notable exceptions being directed to the specific means for displaying information with indicator 51 and for introducing new information by way of input switches 36. The generation of a signal on the line STORE duplicates the information content of the flip-flop 50 in flip-flop 52. However, note that in FIG. 3C, the line STORE is replaced by a line connected to the output of the decoder 68.

The contents of the FIG. 3A flip-flop 52 condition the lamp driver circuit 54 to drive the associated lamp 51. In the absence of an assertive signal on the line ENTER, i.e. when an $\overline{\text{ENTER}}$ signal is present, the flip-flop 50 receives information on the line DATA SERIAL IN from a previous shift register stage. This transfer proceeds by way of AND gate 53*b* upon the application of a pulse on the line PDA2 to an AND gate 53*c*, concurrent with a signal on the SHIFT line input to gate 53*b*.

New information is introduced through the switches 36 by way of AND gate 53*a*. Specifically, whereas previously stored information is normally applied to flip-flop 50 by way of the AND gate 53*b*, new information is stored in flip-flop 50 instead upon the application of a signal on the line ENTER connected to the switch 37 of FIGS. 3, 3*b*, and 3*c*. The signal on the line ENTER conditions the AND gate 53*a* for entering the switch data from switch 36 while at the same time rendering the AND gate 53*b* inactive.

Having now described in detail the logical organization of a preferred embodiment of the present invention, it should be apparent from the foregoing description that there has been provided an apparatus capable of being selectively energized to transfer for purposes of immediate display or subsequent analysis, the information content of the storage elements constituting the data processing system.

With the present invention, it is possible to load selected information into the data processing apparatus by way of the selection switches, or other appropriate means, to aid for example, in locating intermittent faults or other errors. In this respect, a particular bit combination may be entered into the system and the system advanced through one memory cycle or pulse period, whereupon the current contents of the working registers may be read out and compared with a pregenerated bit representation of the correct version of the information, obtained from a nonfaulty machine or other information source. In this manner, errors can be localized to particular areas of the system and in fact to the individual panel boards upon which circuit components are mounted.

The memory cycle or pulse period is not to be construed as a limitation as to the periodicity of operation of the subject invention. It may be desired to procure information on a definite cyclical basis. Thus, information can be automatically read out at rapid intervals and transferred into storage for subsequent analyses.

In addition to serving in a diagnostic capacity, mention has been made of the use of the present invention to facilitate interrupt operations. In this capacity the information presently stored in the active registers of the data processing apparatus can be conveniently stored off in memory or held in the auxiliary shift register of the invention and restored at such time as processing of an interrupting program has been completed.

The construction of the basic storage elements of the preferred embodiment of the present invention is such that the loading and unloading operations characteristic of the interrupt process may be accomplished essentially simultaneously; i.e. within single pulse periods.

While in accordance with the provisions of the statutes, there has been illustrated and described the best form of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having described the invention, what We claim as new and secured by Letters Patent is:

1. In a data processing apparatus having storage and working registers, the combination comprising:
A. a plurality of pairs of associated first and second storage devices;
B. means selectively combining said first storage devices to form said storage and working registers of said data processing apparatus;
C. means connected to enable each second storage device to register a signal representation of the information stored in said associated first storage device; and,
D. means connected to condition each of said second storage devices for transferring stored signal representations received from said first storage devices serially only through said second storage devices.

2. In a data processing apparatus wherein information is stored and processed in a plurality of conventional storage and working register means, each of which comprises a plurality of storage elements, said data processing apparatus further including:
A. a plurality of bistable storage devices corresponding in number to the number of at least selected ones of said elements comprising such storage register means;
B. first means serially interconnecting said storage devices;
C. second means interconnecting each storage device with one selected storage element associated therewith; and
D. control means coupled to said first and second means for effecting the selected duplication of information representations stored in said selected storage elements into said associated bistable devices and for thereafter transferring information representations received from said storage elements serially only through said storage devices.

3. In a data processing apparatus, the combination comprising:
A. a plurality of conventional register means, each of which comprises a number of storage elements;
B. a plurality of bistable storage devices whose number is less than the number of said storage elements constituting said register means;
C. first means interconnecting only said storage devices to form a shift register;
D. second means interconnecting each storage device with one storage element associated therewith; and
E. control means coupled to said second means for duplicating the information representations stored in said storage elements into their associated storage devices for serial transfer of said information representations through said shift register for subsequent storage or analysis.

4. In a data processing system wherein information is processed and stored in a plurality of conventional storage and working register means, each of which comprises plural storage elements, said system further including:
A. a group of bistable storage devices;
B. first logic gating means interconnecting each said storage device to be associated with a different one of said storage elements of said register means;
C. second logic gating means interconnecting each bistable device to form a group of one or more serial auxiliary shift registers;
D. a plurality of control lines connected to said first and second logic means;
E. means for applying clocking signals to said storage elements and said storage devices; and
F. control-signal generating means for cyclically generating command signals on said control lines in a predetermined sequence, said control signal generating means being operative to generate signals on selected control lines for conditioning said first logic gating means to duplicate in each storage device the information contents of the storage element associated therewith, and for conditioning said second logic means to serially transfer, upon the occurrence of successive clocking signals; said information through at least part of said group of said auxiliary shift registers.

5. The apparatus of claim 4 wherein the number of bistable storage devices interconnected to form said shift register is less than the number of storage elements constituting said storage devices of said register means.

6. In a data processing system having storage and working register means, the combination comprising:
A. a plurality of pairs of first and second associated storage devices;
B. first means selectively combining said first storage devices to form at least selected ones of said register means;
C. second means connected to enable said second storage devices to register a signal representation of information stored in said first storage device associated therewith;
D. auxiliary means for displaying or storing the signal representations transferred thereto, and
E. control means for transferring the signal representations stored in said second devices serially through others of said second storage devices to said auxiliary means.

7. A data processing system wherein information is stored in a plurality of conventional register means, each of which comprises plural storage elements, said data processing apparatus further including:
A. a plurality of bistable storage devices, each associated with a different storage element of said register means;
B. first logic gating means interconnecting each storage device with said storage element associated therewith;
C. second logic gating means serially interconnecting each bistable device to form auxiliary shift register means;
D. display means connected in series with said shift register means; and
E. control signal generating means for cyclically generating control signals for conditioning said first logic gating means for duplicating the information stored in said elements into said bistable devices associated therewith, and for conditioning said second logic gating means to serially transfer said duplicated information through said plurality of bistable devices of said shift register means to said display means.

8. The apparatus of claim 7 wherein
A. said display means includes
1. a plurality of storage elements forming a display shift register;
2. a plurality of indicator storage means;

3. indicator logic gating means connecting the storage elements of said display shift register to individual ones of said indicator storage means;
4. first sensing means connected with the output of said auxiliary shift register means and the input of said display shift register; and
5. second sensing means connected with the input of said auxiliary shift register means and said display shift register; and B. said control signal generator means is operable to generate a signal prior to the serial transfer of information through said auxiliary shift register means for loading said first sensing means with a leading sentry bit and is operable to condition said second sensing means for detecting the arrival of said sentry bit.

9. The apparatus of claim 7 wherein
A. said display means includes
1. a plurality of storage elements forming a display shift register connected in series with said auxiliary shift register means;
2. a plurality of indicator storage means;
3. indicator logic gating means interconnecting the storage elements of said display shift register to individual ones of said indicator storage means; and B. said control signal generating means includes means for detecting the completion of the serial transfer of said duplicated information to said display means, and for conditioning at that time said indicator logic gating means to duplicate the contents of said display shift register into said indicator storage means for display by said display means.

10. The apparatus of claim 9 wherein the storage elements of said display shift register correspond in number to the number of the bistable devices of said auxiliary shift register means.

11. The apparatus of claim 9 wherein the number of storage elements of said display shift register is less than the number of the bistable devices of said auxiliary shift register means.

12. The apparatus of claim 8 wherein said display means further includes manual switching means connected to selected storage elements of said display shift register means, said switching means being adapted to be manually positioned for selectively loading new information established in accordance with the positioning thereof into the storage elements of said display shift register means.

13. The apparatus of claim 12 wherein said switching means are independently connected to all of the storage elements of said display shift register.

14. The apparatus of claim 9 wherein said display shift register consists of a pair of serially connected storage elements.

15. The apparatus of claim 9 wherein said display means further includes manual switching means individually connected to the storage elements of said display register means, said switching means being adapted to be manually positioned for selectively loading new information established in accordance with the positioning of said switching means into the storage elements of said display shift register means.

16. In a data processing system wherein information is stored in plural conventional storage and working register means, each of which comprises plural storage elements, said system further including:

A. a group of bistable storage devices, each of which is associated with a different one of said storage elements;
B. first logic gating means interconnecting each bistable device and the storage element associated therewith;
C. second logic gating means interconnecting said bistable devices to form a serial auxiliary shift register;
D. a plurality of control lines, each of said control lines connected to the same points within said first and second logic means;
E. means for applying clocking signals to said storage elements and said bistable devices; and
F. control signal generating means connected to said control lines, said control signal generating means being operative during a cycle to generate a number of command signals on said control lines in a predetermined sequence wherein a first control signal applied to a first one of said lines conditions said first logic means to duplicate in each storage device the information contents of the storage elements associated therewith, and a second control signal on a second one of said lines to condition said second logic means to thereafter serially transfer, upon the occurrence of successive clocking signals, said information through said auxiliary shift register; and said control signal generator being operative during the latter portion of said operative cycle to generate a third signal applied to a third one of said control lines for conditioning said first set of logic gating means for duplicating or restoring the contents of said bistable devices into said storage elements.

17. The apparatus of claim 16 further including means for selectively connecting said third control line in common to said first set of logic gating means of different ones of said storage elements of said working registers whereby the application of said third signal to said third control line conditions said first set of logic means for selective loading of said storage elements of said working registers with the contents of corresponding bistable devices of said auxiliary shift register.

18. In a data processing system, the combination comprising:

A. a plurality of paired storage devices;
B. first means selectively combining a first storage device of each said pair to form the various storage and working registers of said data processing system;
C. second means connected to enable a second storage device of each said pair to register a signal representation of the information content stored in the first storage device paired therewith;
D. means interconnecting said second storage devices to form a shift register;
E. control means for transferring the stored signal representation registered in each said second device serially through other said second devices of said shift register; and
F. memory means having a plurality of locations and being connected with one working register of said system, said one register being connected to enable groups of said stored signal representations to be successively duplicated therein from said second storage devices paired therewith for storage in sequential locations of said memory means during the serial transfer of said stored signal representations through said shift register.

19. A data processing system in which register means store information and said register means comprise a number of storage elements, said data processing system further including;

A. a plurality of bistable devices, each associated with at least one of said storage elements;
B. first sets of logic gating means interconnecting said bistable devices and said associated storage elements;
C. second logic gating means serially interconnecting only said bistable devices to form an auxiliary shift register;
D. gating means connected in series with said shift register to form a closed loop path;
E. memory means having a plurality of addressable memory locations;
F. addressing means connected to said memory means for referencing any one of said addressable memory locations during an operative cycle;
G. means connecting the output of said memory means with a first register means of said system; and
H. control signal generating means for generating, in a predetermined sequence;
1. first control signals for conditioning said addressing means for referencing successive memory locations,
2. second control signals for selectively transferring the contents read out from said first register means into said bistable devices associated therewith, and 3. third control signals for conditioning said second logic means and said gating means for transferring said memory contents serially through said bistable devices.

20. The apparatus of claim 19 wherein said control signal generating means is further operative to generate signals for conditioning said first sets of logic gating means for interchanging the contents of said bistable elements with the contents of the associated storage elements.

21. The apparatus of claim 20 wherein said control signal generating means is operative to generate a further signal for conditioning one of said first sets of logic gating means for restoring or duplicating the information representations previously stored in the bistable devices in the storage elements associated therewith.

22. In a data processing apparatus including storage and working registers, the combination comprising;

a plurality of associated like first and second storage devices;

means selectively combining said first storage devices to form said storage and working registers;

first means connected to enable each said second storage device to duplicate simultaneously, a signal representation of the information state of said associated first storage device; and, second means connected to enable each said first storage device to duplicate therein a signal representation of the information state of said associated second device whereby said states of said storage and working registers are temporarily stored in said second storage devices for subsequent restoring.

23. The apparatus of claim 22 further including:

gating means serially interconnecting each of said second storage devices to form a shift register;

a data source coupled to at least one of said second storage devices for serially transferring information signals thereto; and, control means coupled to said gating means for conditioning said second storage devices to serially transfer information signals through said shift register, said control means further including counting means coupled to said data source and being adapted to terminate the transfer of said information signals upon the transfer of a predetermined number of said signals whereafter said control means is connected to condition said second means for duplicating said information signals of said data source into each of said first storage devices.

24. In a data processing apparatus wherein information is stored and processed in a plurality of conventional storage and working registers, each of which comprises a plurality of basic storage elements, said data processing apparatus further including:

a plurality of auxiliary storage devices corresponding in number to the number of at least selected ones of said basic storage elements comprising said registers;

first logic AND gating means connecting each said auxiliary storage elements to duplicate the information state of its associated basic storage element, said AND gate including means for receiving a line SNAPOUT; and, second AND gating means for enabling each said basic element to duplicate the information state of its auxiliary storage device, said second AND gating means including means for receiving a line SNAP-IN wherein the successive application of signal levels to said lines SNAPOUT and SNAP-IN enables said auxiliary and basic elements respectively to store and restore the information states of said basic elements as stored prior to the application of said signal level to said line SNAPOUT.

25. The apparatus of claim 24 wherein said first logic AND gate means and said second logic AND gate means respectively further includes means for receiving lines PDA1 and PDA2 and means for applying clocking signals in a predetermined manner to said lines PDA1 and PDA2 whereby said clocking signals produce the interchange of information states between said basic and auxiliary elements when said signal levels are applied jointly to said lines SNAPOUT and SNAP-IN.

26. The apparatus of claim 24 wherein said apparatus further includes:

third AND gating means serially connecting each of said auxiliary storage elements to form an auxiliary shift register, said gating means including means for receiving a line SHIFT;

a memory connected to at least one of said auxiliary storage elements for serially transferring information signals thereto; and, control means connected to said second and third AND gating means for applying signal levels to said lines SHIFT and SNAP-IN respectively so as to condition said third AND gating means to serially transfer said information signals through said auxiliary shift register and after the transfer of a predetermined number of said signals, condition said second AND gating means for enabling said selected basic storage elements to duplicate therein the information states of their associated auxiliary storage devices.

27. In a data processing system wherein information is stored in a plurality of conventional storage devices and working registers, each of which comprises a number of basic storage elements, said system further including:

a group of bistable auxiliary storage devices;

a first set of AND logic gating means interconnecting each said auxiliary storage device to be associated with a different one of said basic storage elements of said registers;

a second set of AND logic gating means interconnecting each auxiliary storage device to form a serial auxiliary shift register;

a plurality of control lines SNAP-IN, $\overline{\text{SNAP-IN}}$, SNAPOUT, SHIFT being connected to the same points within said first and second logic means and clocking lines PDA1 and PDA2 for applying clocking signals to said basic storage elements and auxiliary storage devices respectively;

control signal generating means for generating command signal levels to said control lines in a predetermined sequence, said control signal generating means being operative to generate signal levels on said SNAPOUT and SHIFT control lines for conditioning said first and logic gating means to duplicate simultaneously the information contents of the basic storage elements associated therewith in each of said auxiliary storage devices, and for conditioning said second AND logic means to thereafter serially transfer, upon the occurrence of successive clocking signals applied to the line PDA2, said information contents through said auxiliary shift register.

28. The system according to claim 27 further including auxiliary means connected in series with said auxiliary shift register to form a closed loop path, said auxiliary means including switching means for modifying said information contents as they are shifted through said auxiliary shift register prior to being returned to said basic storage elements.